United States Patent [19]
Morishima

[11] Patent Number: 5,640,376
[45] Date of Patent: Jun. 17, 1997

[54] TRACK KICK DEVICE IN A DISC RECORDING AND REPRODUCING APPARATUS

[75] Inventor: Morito Morishima, Shizuoka, Japan

[73] Assignee: Yamaha Corporation, Japan

[21] Appl. No.: 577,772

[22] Filed: Dec. 22, 1995

[30] Foreign Application Priority Data

Dec. 27, 1994 [JP] Japan .................................. 6-338267

[51] Int. Cl.$^6$ .................................................. G11B 7/085
[52] U.S. Cl. .................................. 369/44.28; 369/54
[58] Field of Search ........................... 369/44.25, 44.28, 369/44.29, 54, 58

[56] References Cited

U.S. PATENT DOCUMENTS

| | | | |
|---|---|---|---|
| 5,072,434 | 12/1991 | Uchikoshi et al. | 369/44.28 |
| 5,184,338 | 2/1993 | Shimoda et al. | 369/44.28 X |
| 5,327,410 | 7/1994 | Gleim et al. | 369/44.28 |
| 5,371,726 | 12/1994 | Suzuki | 369/44.28 |
| 5,394,386 | 2/1995 | Park et al. | 369/44.28 |
| 5,408,452 | 4/1995 | Sakemoto et al. | 369/44.28 X |

Primary Examiner—W. R. Young
Attorney, Agent, or Firm—Graham & James LLP

[57] ABSTRACT

A track kick device for a disc recording and reproducing device includes a direction determination device 1 outputting a forward pulse FWD or a backward pulse BWD according to a relation in phase between a pit position signal HFD and a tracking error signal TER, a track counter 2 counting the pulse FWD to increase its count value, the pulse BWD to decrease it, and a phase comparator 4, and a reference pulse generator 3 outputting a reference pulse for determining a speed of movement for the pickup. In the case of a track count mode, the phase comparator 4 outputs an acceleration pulse KP+ or a deceleration pulse KP− so that the tracking error signal TER is synchronous with the reference pulse, and in the case where a brake mode is effected in which the count value represents the aimed track, the phase comparator 4 outputs a brake pulse so that those signals HFD and TER indicates the on-track state of the pickup.

11 Claims, 5 Drawing Sheets

TRACK KICK DEVICE IN A DISC RECORDING AND REPRODUCING APPARATUS

BACKGROUND OF THE INVENTION

1. Field of the Invention

The present invention relates generally to a disc recording and reproducing apparatus provided for diskc such as Compact Discs (CD) and Mini Discs (MD), and more particularly to a track kick device in the aforementioned apparatus which is adapted to move the pick-up in a kick mode.

2. Related Art

Heretofore, a conventional track kick operation of a CD player is controlled by counting the zero cross point of the fall of a tracking error signal which is produced periodically when the pickup moves across tracks on a Compact Disc. That is, the pickup is so controlled that it is stopped when a given number of tracks is counted.

However, the above-described conventional track kick operation is disadvantageous in that the pickup sometimes cannot be stopped at the aimed track because the pickup moves at high speed. If such a trouble occurs, it is necessary to search for the aimed track all over again. That is, the conventional device suffers from a problem that time is wasted for the track kick operation.

SUMMARY OF THE INVENTION

The present invention was made in view of the foregoing difficulties accompanying the conventional switching power circuits. Accordingly, an object of the invention is to provide a track kick device for a disc recording and reproducing apparatus capable of stopping a pickup at an aimed track stably and accurately.

The foregoing and other objects can be achieved by the provision of a track kick device for a disc recording and reproducing apparatus, which, according to the invention, includes: direction determination device which receives pit position data corresponding to a pit position of a record disc and tracking error data both produced when a pickup moves across tracks on the record disc in a track kick operation, and outputs a first pulse for count-increment or a second pulse for count-decrement according to a relation in phase between the pit position data and tracking error data; a count device which counts the first pulse to increase the count content thereof and the second pulse to decrease the counter content thereof; a reference pulse generating device for outputting a reference pulse to determine a speed of movement for the pickup; and a phase comparison device which, for the period of time that the count value of the count device does not indicate the count value of an aimed track, compares the phase of the tracking error data with the phase of the reference pulse, and outputs an acceleration pulse or a deceleration pulse according to a direction of movement of the pickup so that the phase of the tracking error data is coincident with the phase of the reference pulse, and for the period of time that the count value of the count device indicates the count value of the aimed track, outputs a brake pulse so that the pit position data and the tracking error data indicate an on-track state.

In the track kick device of the present invention, the reference pulse for determining a speed of movement for the pickup is outputted, and the phase of the tracking error signal is compared with the phase of the reference pulse, and the acceleration pulse or the deceleration pulse is produced so that the phase of the tracking error signal is coincident with that of the reference pulse. Hence, the pickup moves at a constant rate at all times. That is, the speed of movement of the pickup is so controlled that the pickup can be stopped at any time. Hence, with the device, one search operation is able to move the pickup to the aimed track stably and accurately.

Further, according to another aspect of the present invention, in a case where it is detected that the pickup positions far from the aimed track in accordance with the count value of the track counter, the frequency of the reference pulse is set high, whereas it is detected that the pickup positions close to the aimed track the frequency of the reference pulse is set low. Therefore, the jump of the pickup can be accomplished accurately at a high speed so that the pickup can move to the aimed track within a very short time.

DESCRIPTION OF THE PREFERRED EMBODIMENTS

A preferred embodiment of the present invention will now be described in detail with reference to the accompanying drawings.

Figure 1:
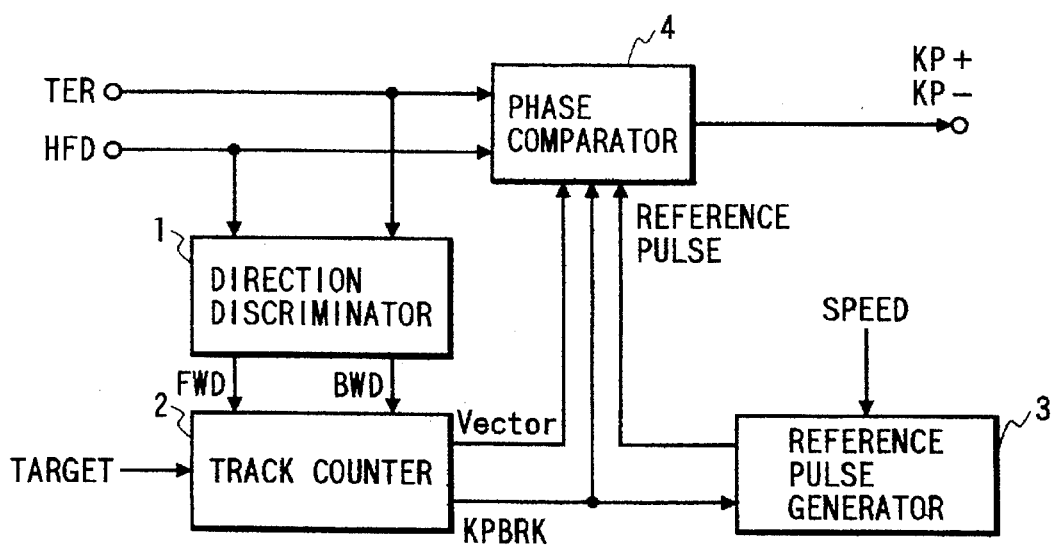
FIG. 1 is a block diagram showing the arrangement of essential parts of a track kick device, which constitutes a preferred embodiment of the invention.

FIG. 1 is a block diagram showing the arrangement of essential parts of a track kick device for a CD player, which constitutes a preferred embodiment of the invention.

The circuit, as shown in FIG. 1, receives a pit position signal HFD and a tracking error signal TER, and applies a positive direction pulse KP+ or a negative direction pulse KP− to a pickup driving motor (not shown). The circuit includes a direction determination device 1, a track counter 2, a reference pulse generator 3, and a phase comparator 4, and forms a track kick phase-locked loop (PLL) together with a pickup drive control system (not shown) and a pickup drive motor (not shown).

When a track jump occurs for some reason (scratch, vibration, feed movement, kick movement, etc.) after the track counter 2 is enabled, depending on the relation in phase between the pit position signal HFD and the tracking error signal TER the direction determination device 1 outputs a forward pulse FWD or a backward pulse BWD, so that the count value of the track counter 2 is increased or decreased (the counter being incremented or decremented) whereby the relative number of tracks from the aimed track can be detected.

The direction determination device 1 receives the pit position signal HFD and the tracking error signal TER, to form the forward pulse FWD or the backward pulse BWD depending on the relation in phase between those signals HFD and TER.

Figure 2:
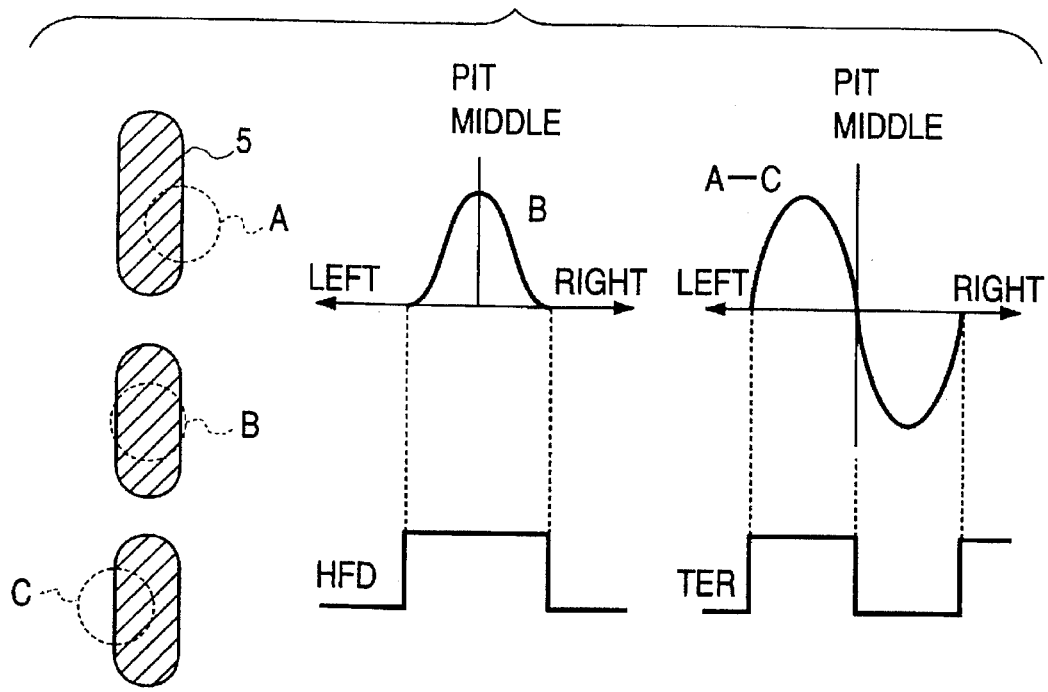
FIG. 2 is a diagram for a description of a pit position signal and a tracking error signal which is applied to the device of the invention.

The signals HFD and TER applied to the direction determination device 1 are formed as follows: For instance in the case of a three-beam type pickup as shown in FIG. 2, the signals are formed by using three beam spots A, B and C which are formed on a straight line which is slightly inclined with respect to the direction of arrangement of pits 5 of the CD. The pit position signal HFD is a signal which is raised to "1 (high level)" when the pickup is located on a pit 5 (the pickup being in an "on-track" state), and it is formed by binary-coding the detection signal of the middle beam spot B in FIG. 2. The tracking error signal TER is a signal whose level is inverted with the center of a pit 5 as a reference, and it is therefore formed by binary-coding the difference between the detection signals of the beam sports A and C.

Figure 3:
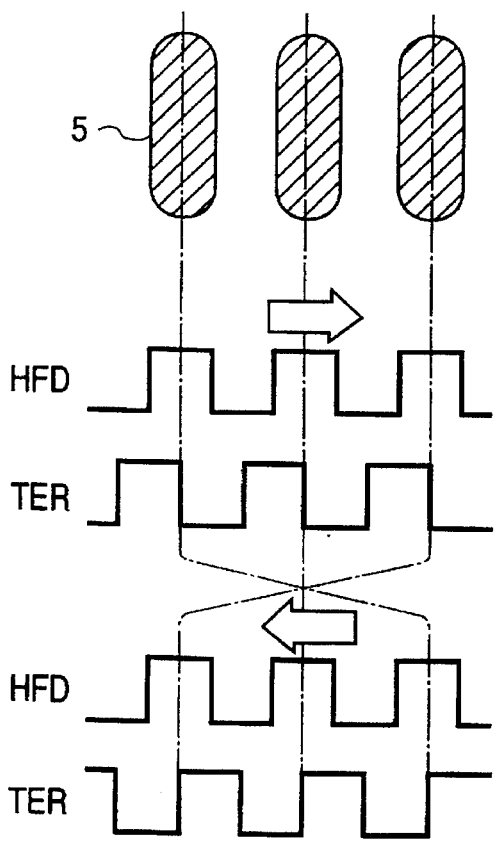
FIG. 3 is a diagram for a description of relationships in phase between the pit position signal and the tracking error signal with respect to the directions of movement of the pickup.

In the case where, as shown in FIG. 3, the pickup, moving to the right (towards the outer periphery of the CD), goes across pits 5, the "on-track" state is obtained when the tracking error signal TER falls with the pit position signal HFD at "1". In contrast, in the case where the pickup, moving to the left (towards the inner periphery), goes across pits 5, the "on-track" state is obtained when the tracking error signal TER rises with the pit position signal HFD at "1". That is, the phase of the tracking error signal TER is changed by 180° depending on the track kick direction.

Figure 4:
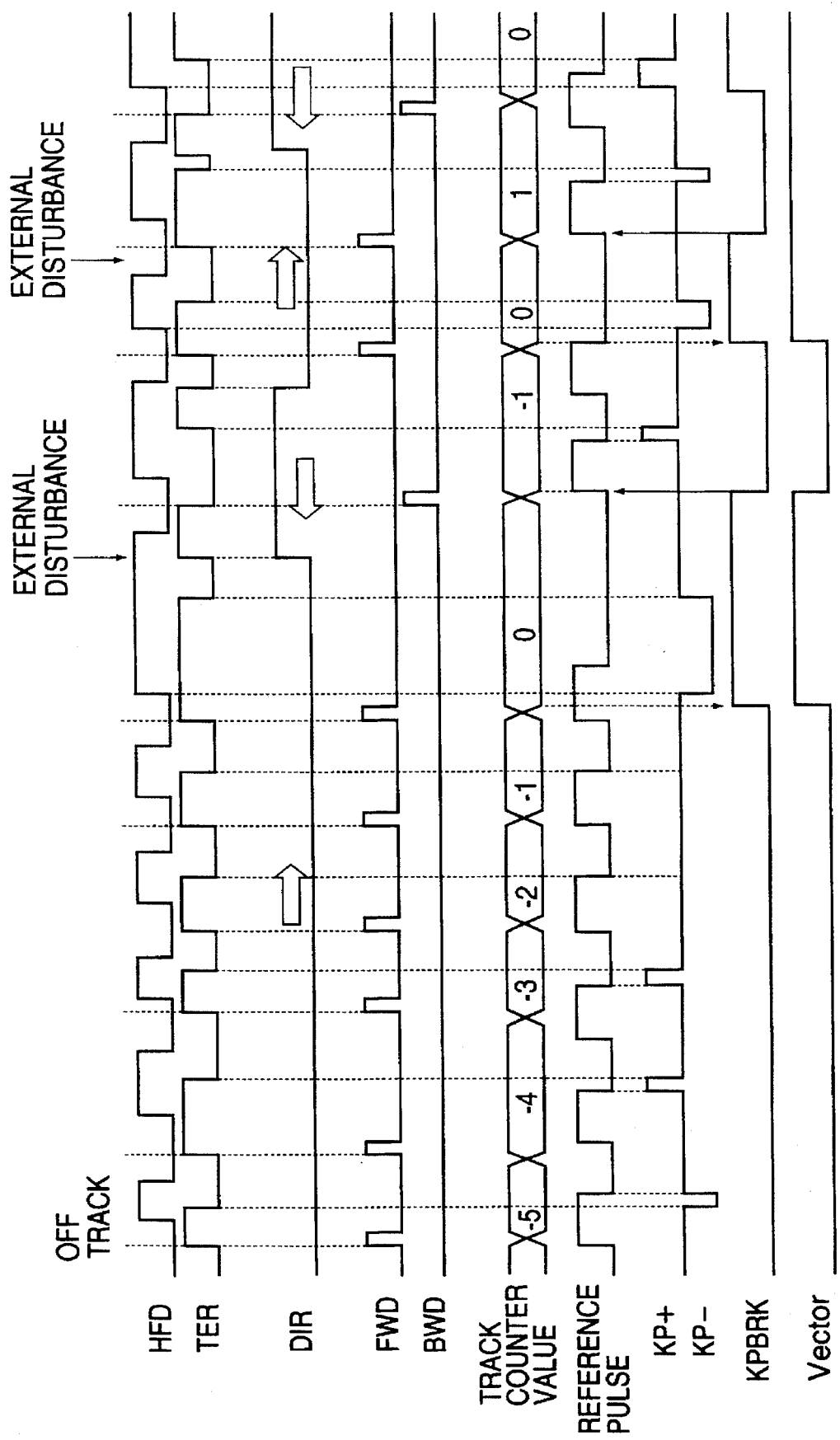
FIG. 4 is a time chart for a description of the operation of the track kick device of the invention.

Thus, when the pickup moves to the right, the direction determination device 1 outputs the forward pulse FWD as shown in FIG. 4; and when the pickup moves to the left, the direction determination outputs the backward pulse BWD. That is, the forward pulse FWD is formed in correspondence to the rise of the tracking error signal TER when the pickup is in an "off-track" state (HFD being at "0 (low level)"); and the backward pulse BWD is formed in correspondence to the fall of the tracking error signal TER when the pickup is in the "off-track" state.

Figure 5:
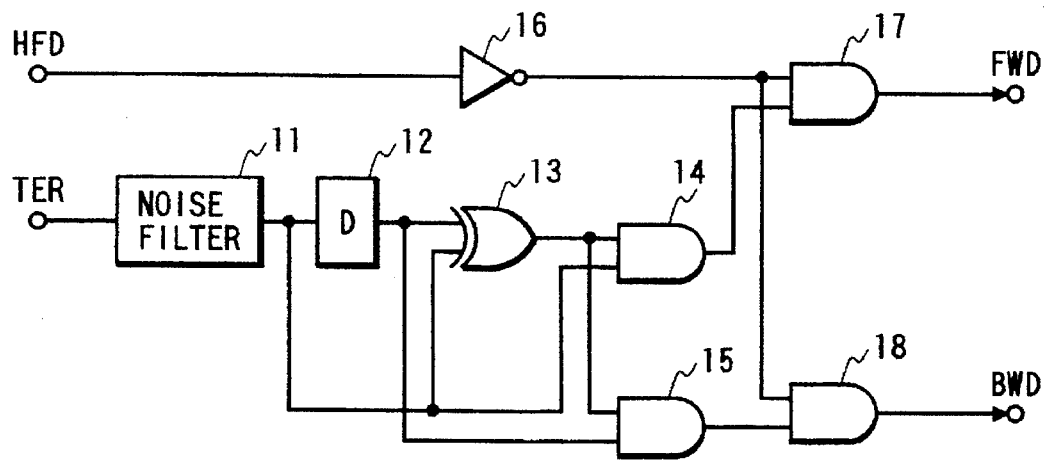
FIG. 5 is a block diagram showing the arrangement of a direction determination device in the device of the invention.

FIG. 5 is a block diagram showing an example of the direction determination device 1.

In order to prevent an erroneous operation, the tracking error signal TER is applied to a noise filter 11, where its noise component higher than 150 Hz (inclusive) is cut off. The output of the noise filter 11 is applied to a delay circuit 12 and an EX-OR gate 13, so that differential pulses of the signal TER are formed. Of those differential pulses, one which is synchronous with the fall of the signal TER is gated by an AND gate 14 with the aid of the signal TER, and one which is synchronous with the rise of the signal TER is gated by an AND gate 15 with the aid of the delay signal of the signal TER. The pulse synchronous with the rise of the signal TER is employed as the forward pulse FWD when selected by an AND gate 17 with the aid of a signal which is obtained by inverting the pit position signal HFD with an inverter 16. The pulse synchronous with the fall of the signal TER is employed as the backward pulse BWD when selected by an AND gate 18 with the aid of the inversion signal of the pit position signal HFD.

Those pulses FWD and BWD are supplied to the track counter 2. In the case of a feed movement or kick movement, the track counter 2 receives a target value from a CPU (not shown) before a track kick operation is effected. The target value is, for instance, the number of tracks which the pickup should cross to reach the aimed track. In the case of a track kick to the right, a negative value is provided as the target value; and in the case of a track kick to the left, a positive value is provided as the target value. The circuit functions so that the count value of the track counter 2 converges to zero "0" at all times. Hence, when a track jump occurs with the pickup in the on-track state, the pickup is automatically kicked back to the original track.

As is seen from FIG. 4, upon reception of the forward pulse FWD, the track counter 2 increases its count value; and upon reception of the backward pulse BWD, it decreases its count value. In addition, the counter 2 outputs a brake mode signal KPBRK indicating the fact that the count value is zero (0); i.e., the pickup is located on or near the aimed track, and a direction signal "Vector" indicating the fact that the count value is other than zero (0); that is, the pickup is located on the right, i.e., the track counter value is equal to or more than 0 (0 or positive value), or left, i.e., the counter value is less than 0 (negative value), of the aimed position. When the brake mode signal KPBRK is at "0", a track count mode is effected; and when it is at "1", a brake mode is effected.

Figure 8:
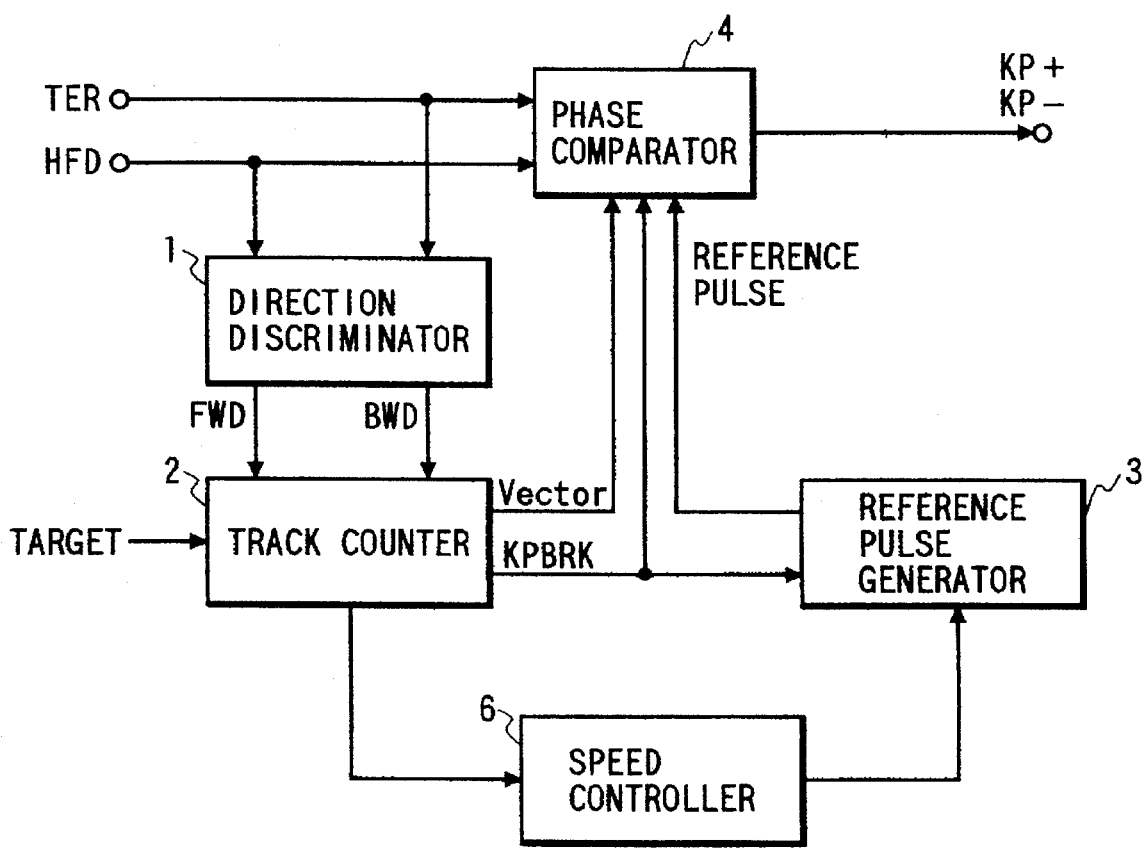
FIG. 8 is a block diagram showing the arrangement of essential parts of a track kick device, which constitutes an modification of the embodiment of the invention shown in FIG. 1.

The reference pulse generator 3 is adapted to output a reference pulse to determine a speed of movement for the pickup. The speed of the reference pulse can be changed in 256 steps, from 100 Hz to 10 KHz. The reference pulse can be set manually to a predetermined speed as shown in FIG. 1 or changed in accordance with the count value of the track counter under a control of a speed controller 6 as shown in FIG. 8$. Specifically, the speed (or frequency) of the reference pulse is determined in such a manner that when the absolute count value of the track counter is large, that is, the distance between the pickup and the aimed track is detected as long, the movement speed of the pickup is set high and, in contrast, when the distance between the pickup and the aimed track is detected as short, the movement speed of the pickup is set low. Accordingly, if the pickup is far distanced from the aimed track, the number of the pulses KP+ and KP− generated during a unit time period is more than that if the pickup locates close to the aimed track. Owing to the operation, the pickup can move accurately at a high speed. On the other hand, when the pickup is moving at a high speed, if the pickup comes close to the aimed track, the pickup may pass over the aimed track due to the inertia. In order to avoid it, according to the present invention, the pickup moves at a low speed when it comes close to the aimed track, so that the pickup can reach the aimed track more accurately and earlier than at high speed as a result thereof.

The reference pulse is preset with the fall of the brake mode signal KPBRK outputted by the track counter 2; and, in the brake mode, it is not outputted, or disregarded in the phase comparator 4.

In the case of the track count mode, in order that the tracking error signal TER be synchronous with the reference pulse, the phase comparator 4 outputs the positive direction pulse KP+ or the negative direction pulse KP− for control of the speed of movement of the pickup. In the case of the brake mode, the phase comparator 4 outputs a speed reduction signal for the period of time which elapses from the rise of the bit position signal HFD until the fall of the tracking error signal TER (in the movement to the right) or the rise of the latter TER (in the movement to the left).

Figure 6:
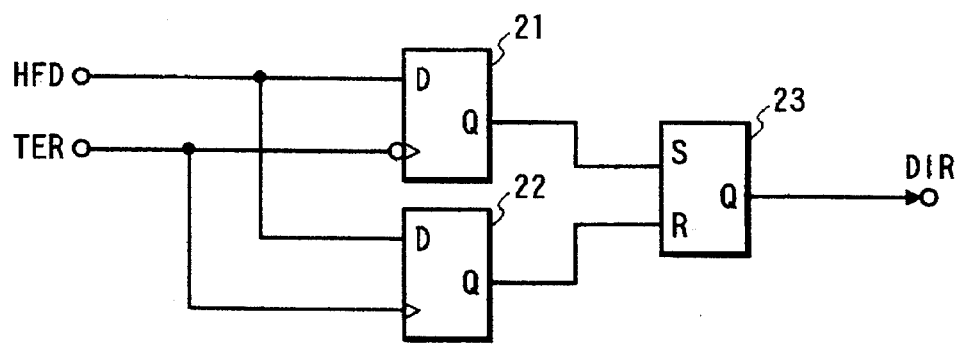
FIG. 6 is a block diagram showing the arrangement of a part of a phase comparator in the device of the invention.
Figure 7:
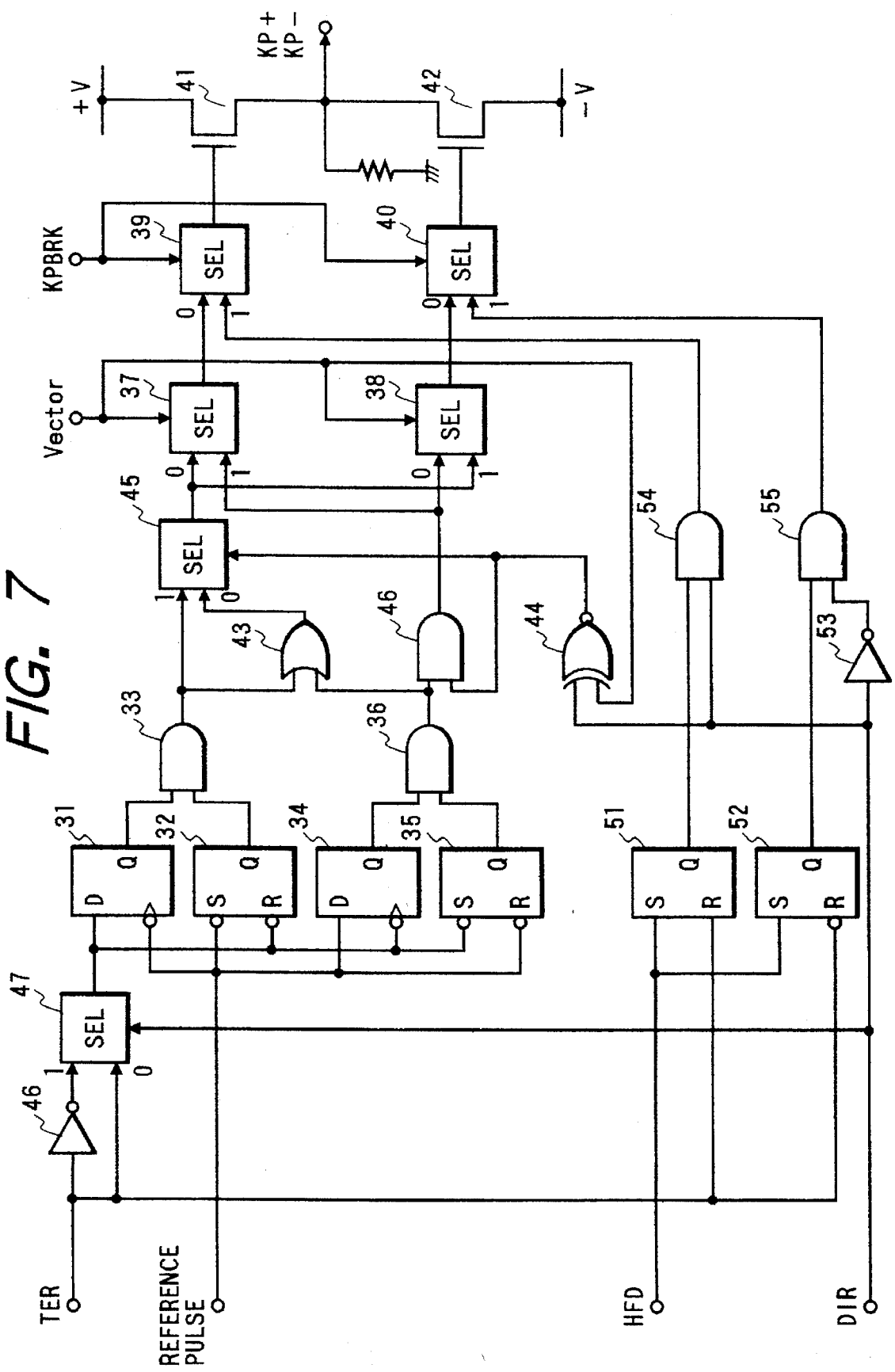
FIG. 7 is a block diagram showing the arrangement of the remaining part of the phase comparator.

FIGS. 6 and 7 are block diagrams showing an example of the phase comparator 4.

The circuit shown in FIG. 6 detects the direction in which the pickup moves. In the case where the pit position signal is at "1" when the tracking error signal TER falls, the pickup moves to the right; and in the case where pit position signal is at "1" when the tracking error signal TER rises, then the pickup moves to the left. Hence, the right movement, and the left movement are detected with D flip-flops (hereinafter referred to as "D-FFs", when applicable) 21 and 22. The detection signals of those movements are used to set and reset an SR flip-flop (hereinafter referred to as "an SR-FF", when applicable) 23, so that the latter 23 outputs a movement direction signal DIR as shown in FIG. 4.

The circuit shown in FIG. 7 forms the pulses KP+ and KP−. In the track count mode, the pulses KP+ and KP− are outputted as indicated in following Table 1.

On the other hand, in the case of the brake mode, the pulses KP+ and KP− are outputted as indicated in following Table 2.

TABLE 2

| Brake Mode | | |
|---|---|---|
|  | Right movement | Left movement |
| Rise of HFD - Fall of TER | KP− | 0 |
| Rise of HFD - Rise of TER | 0 | KP+ |

That is, a signal which is set with the rise of the pit position signal HFD and reset with the rise of the tracking

TABLE 1

| Track Count Mode (KPBRK = 0) | | | | |
|---|---|---|---|---|
|  | On the left side of the aimed position (Vector = 0) | | On the right side of the aimed position (Vector = 1) | |
|  | Right movement | Left movement | Right movement | Left movement |
| TER lags the reference pulse | KP+ (Acceleration) | KP+ (Deceleration) | KP− (Deceleration) | KP− (Acceleration) |
| TER leads the reference pulse | KP− (Deceleration) | KP+ (Deceleration) | KP− (Deceleration) | KP+ (Deceleration) |

Now assuming that the pickup located on the left side of the aimed position moves right. In the case where the tracking error signal TER lags the reference pulse, a D-FF 31, an SR-FF 32 and an AND gate 33 are operated to form a pulse which is set with the fall of the reference pulse, and reset with the rise of the signal TER. In the case where the tracking error signal TER leads the reference pulse, a D-FF 34, an SR-FF 35 and an AND gate 36 are operated to form a pulse which is set with the fall of the reference pulse, and reset with the fall of the signal TER. Those pulses are applied through select circuits 37, 38, 39 and 40 to the gates of transistors 41 and 42, thus being outputted as the positive direction pulse KP+ and the negative direction pulse KP−, respectively.

In the case where the pickup located on the left side of the aimed position moves left, the positive direction KP+ is outputted independently of the relation in phase between the reference pulse and the tracking error signal TER. Hence, the output of the AND gate 33 or the output of the AND gate 36, which is provided through an OR gate 43, is selected with the aid of an EX-NOR gage 44, a select circuit 45, and an AND gate 46.

In the case where the pickup located on the right side of the aimed position moves, the pulses KP+ and KP− are opposite in polarity to those in the above-described case. Hence, the input pulses are swapped with each other by use of the select circuits 37 and 38.

In the case where the pickup moves right, the fall of the tracking error signal TER corresponds to the on-track position; and in the case where the pickup moves left, the rise of the tracking error signal TER corresponds to the on-track position. Hence, the select circuit 47 determines it according to the movement direction signal DIR in advance whether the signal TER should be supplied directly as the input signal or whether the signal which the inverter 16 outputs by inverting the signal TER should be supplied as the input signal.

error signal TER is formed by an SR-FF 51, while a signal which is set with the rise of the signal HFD and reset with the fall of the signal TER is formed by an SR-FF 52. Those signals thus formed are applied to a select circuit comprising an inverter 53 and AND gates 54 and 55, so that one of them is selected according to the movement direction signal DIR.

The select circuits 39 and 40 select the outputs of the select circuits 37 and 38 when the track count mode is effected, and select the outputs of the AND gates 54 and 55.

With the device designed as described above, the track kick operation is performed at a constant rate in synchronization with the reference pulse, and even when a track jump occurs attributing to a scratch or external disturbance such as oscillation, the pickup is automatically kicked back to the original position.

In the track kick device of the invention, the reference pulse for determining a speed of movement for the pickup is outputted, and the phase of the tracking error signal is compared with the phase of the reference pulse, and the acceleration pulse or the deceleration pulse is produced so that the phase of the tracking error signal is coincident with that of the reference pulse. Hence, the pickup moves at a constant rate at all times. That is, the speed of movement of the pickup is so controlled that the pickup can be stopped at any time. Hence, with the device, one search operation is able to move the pickup to the aimed track stably and accurately.

What is claimed is:

1. A track kick device for a disc recording and reproducing apparatus, comprising:
 a direction determination device (1) which inputs pit position data (HFD) corresponding to a pit position on a record disc and tracking error data (TER) which are produced when a pickup moves across tracks on said record disc in a track kick operation, said direction determination device outputting a first pulse for count-increment and a second pulse for count-decrement according to a relation in phase between said pit position data and said tracking error data;

a counter device (2) which counts said first pulse to increase the count content thereof, and said second pulse to decrease the counter content thereof;

a reference pulse generating device (3) which outputs a reference pulse to determine a speed of movement for said pickup, said reference pulse generating device inputs a brake mode signal from said counter device indicating the fact that the count value is zero;

a phase comparison device (4) which, for a period of time that the count value of said counter device does not indicate the count value of an aimed track, compares the phase of said tracking error data with the phase of said reference pulse, and outputs one of an acceleration pulse and a deceleration pulse according to a direction of movement of said pickup so that the phase of said tracking error data is coincident with the phase of said reference pulse, and for the period of time that the count value of said counter device indicates the count value of said aimed track, outputs a brake pulse so that said pit position data and said tracking error data indicate an on-track state.

2. The track kick device according to claim 1, wherein said direction determination device (1) comprises a noise filter (11) to which said tracking error signal is applied and a device for forming differential pulses of said tracking error signal.

3. The track kick device according to claim 2, wherein said differential pulses forming device comprises a delay circuit (12) for delaying said tracking error signal and an EX-OR gate (13) inputting an output of said delay circuit and said tracking error signal, and said direction determination device (1) further comprising:

a first AND gate (14) inputting said tracking error signal and an output of said EX-OR gate;

a second AND gate (15) inputting the delayed tracking error signal and the output of said EX-OR gate;

a third AND gate (17) inputting an inverted input pit position data and an output of said first AND gate, said third AND gate generating said first pulse for count-increment; and a fourth AND gate (18) inputting said inverted input pit position data and an output of said second AND gate, said fourth AND gate generating said second pulse for count-decrement.

4. The track kick device according to claim 1, wherein said phase comparison device comprising:

a first pulse forming circuit for forming a first pulse which is set with the fall of said reference pulse, and reset with the rise of said tracking error signal;

a second pulse forming circuit for forming a second pulse which is set with the fall of said reference pulse, and reset with the fall of said tracking error signal;

a third pulse forming circuit for forming a third pulse which is set with the rise of said pit position signal and reset with the rise of said tracking error signal;

a fourth pulse forming circuit for forming a fourth pulse which is set with the rise of said pit position signal and reset with the fall of said tracking error signal; and a selector circuit for selecting outputs of said first and second pulse forming circuits with the aid of output signals of said third and fourth pulse forming circuits.

5. The track kick device according to claim 4, wherein said first pulse forming circuit comprises a D-FF (31), an SR-FF (32) and an AND gate (33), said second pulse forming circuit comprises a D-FF (34), an SR-FF (35) and an AND gate (36), said third pulse forming circuit comprises an SR-FF (51), said fourth pulse forming circuit comprises an SR-FF (52), and said selector circuit comprises an OR gate (43), an EX-NOR gate (44), a select circuit (45), and an AND gate (46).

6. The track kick device according to claim 1, wherein said phase comparison device further comprises a pickup movement detection circuit for detecting the direction of the pickup movement in accordance with said input pit position data and said tracking error data.

7. The track kick device according to claim 6, wherein said pickup movement detection circuit comprises a couple of D flip-flops (21, 22) and an SR flip-flop (23), said pickup movement detection circuit outputs a movement direction signal (DIR).

8. The track kick device according to claim 1, wherein said reference pulse generating device (3) changes the speed of the reference pulse in 256 steps, from 100 Hz to 10 KHz.

9. The track kick device according to claim 1, wherein said reference pulse changes in accordance with the count value of said counter device.

10. The track kick device according to claim 1, wherein the movement speed of said pickup changes in accordance with the distance between the location of the pickup and that of the aimed track.

11. The track kick device according to claim 9 or 10, further comprising a speed controller connecting to said counter device and said reference pulse generating device.

* * * * *